US008097328B2

(12) United States Patent
Hama

(10) Patent No.: US 8,097,328 B2
(45) **Date of Patent: *Jan. 17, 2012**

(54) HIGH-PRESSURE MELAMINE RESIN DECORATIVE PLATES

(75) Inventor: Kazuhiro Hama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/692,239

(22) Filed: Mar. 28, 2007

(65) Prior Publication Data

US 2007/0231551 A1 Oct. 4, 2007

(30) Foreign Application Priority Data

Mar. 28, 2006 (JP) ................................ 2006-088936

(51) Int. Cl.
*B32B 3/10* (2006.01)

(52) U.S. Cl. .................... 428/195.1; 428/201; 428/203; 428/220

(58) Field of Classification Search .................. 428/141, 428/195.1

See application file for complete search history.

(56) References Cited

U.S. PATENT DOCUMENTS

| | | | | |
|---|---|---|---|---|
| 4,459,379 | A * | 7/1984 | Schwarz | 523/501 |
| 4,801,495 | A * | 1/1989 | van der Hoeven | 442/412 |
| 4,855,184 | A * | 8/1989 | Klun et al. | 428/425.1 |
| 5,266,397 | A * | 11/1993 | Ogawa et al. | 428/323 |
| 6,326,074 | B1 * | 12/2001 | Takahashi | 428/156 |
| 6,428,875 | B1 * | 8/2002 | Takahashi et al. | 428/172 |
| 6,596,805 | B1 * | 7/2003 | Nigam et al. | 524/527 |
| 2004/0241416 | A1 * | 12/2004 | Tian et al. | 428/304.4 |
| 2007/0116933 | A1 * | 5/2007 | Kobayashi et al. | 428/172 |
| 2007/0231583 | A1 * | 10/2007 | Ilzuka et al. | 428/423.7 |
| 2008/0070005 | A1 * | 3/2008 | Kobayashi et al. | 428/161 |
| 2009/0011191 | A1 * | 1/2009 | Saitou et al. | 428/172 |

FOREIGN PATENT DOCUMENTS

| | | | |
|---|---|---|---|
| WO | WO 03/082999 | A1 * | 10/2003 |
| WO | WO 2004060949 | A1 * | 7/2004 |

* cited by examiner

*Primary Examiner* — David Sample
*Assistant Examiner* — Prashant J Khatri
(74) *Attorney, Agent, or Firm* — Antonelli, Terry, Stout & Kraus, LLP.

(57) ABSTRACT

The high-pressure melamine resin decorative plate of the present invention includes a laminate of a decorative sheet, and a melamine resin-impregnated paper and a core layer on a back surface of the decorative sheet, and then the resultant laminated structure is subjected to heat- and press-molding. The decorative sheet includes at least a low-gloss pattern ink layer partially formed on a substrate, and a surface protective layer which is present on and contacted with the low-gloss pattern ink layer so as to cover a whole surface; the surface protective layer is formed by crosslinking and curing an ionizing radiation-curable resin composition, and provided therein with a low-gloss region which is located in a portion just above the low-gloss pattern ink layer and in the vicinity of the portion and visually recognized as a concave portion.

12 Claims, 1 Drawing Sheet

HIGH-PRESSURE MELAMINE RESIN DECORATIVE PLATES

FIELD OF THE INVENTION

The present invention relates to high-pressure melamine resin decorative plates for building materials which have designed patterns on a surface thereof and are used for furniture, office business desks, wall surfaces and flooring materials.

BACKGROUND OF THE INVENTION

Thermosetting resin decorative plates are excellent in various properties such as impact resistance, stain resistance and pencil hardness. Specific examples of the thermosetting resin decorative plates include high-pressure melamine resin decorative plates, low-pressure melamine decorative plates, diallyl phthalate (DAP) resin decorative plates, polyester decorative plates, guanamine resin decorative plates and phenol resin decorative plates. Among these decorative plates, in particular, the high-pressure melamine resin decorative plates have been extensively used for tabletops, sinks, top plates for desks, etc., because they exhibit a high surface hardness, are excellent in heat resistance and stain resistance, and have a good design property capable of allowing various color patterns to be selectively used therefor.

The high-pressure melamine resin decorative plates have been generally produced by the following method. That is, a melamine resin is impregnated into a decorative paper provided on a surface thereof with printed patterns. Then, an overlay paper impregnated with a melamine resin is superposed on a surface of the decorative paper, and a core paper prepared by impregnating a thermosetting resin such as a phenol resin into a paper substrate such as a kraft paper, is superposed on a back surface thereof. The resultant layered structure is sandwiched between metal plates and molded into an integral laminate by applying a high temperature and a high pressure thereto.

However, the production efficiency of these conventional melamine resin decorative plates is low because of complicated production process thereof. To solve this problem, there have been proposed melamine resin decorative plates which are produced without conducting the above resin impregnating step, i.e., by superposing an overlay paper on a surface of a resin-non-impregnated decorative paper and a core layer on a back surface thereof, and then forming the resultant layered structure into an integral laminate by applying a temperature and a pressure thereto (refer to JP 48-5866A and JP 52-100576A). In the above conventional method, the melamine resin impregnated into the overlay paper is fluidized by heating, and a part of the fluidized melamine resin is penetrated into the decorative paper. When the resin is thermally cured, the respective layers are integrated into a late to produce the melamine resin decorative plates.

However, the above melamine resin decorative plates have such a problem that the printed patterns provided on the surface of the decorative paper are concealed by the overlay paper, resulting in poor design property of the obtained decorative plates. To solve this problem, there has been proposed such a melamine decorative plate which is produced by successively laminating a melamine resin-impregnated paper and a core layer on a resin-non-impregnated back surface of a decorative paper and then forming the laminated structure into an integral laminate by applying a temperature and a pressure thereto (refer to JP 10-95091A).

SUMMARY OF THE INVENTION

The above conventional melamine decorative plates produced by laminating the melamine resin-impregnated paper and the core layer on the back surface of the decorative paper and then subjecting the resultant laminated structure to heat- and press-molding are free from deterioration in design property owing to the overlay paper. However, the design-imparting surface of the decorative paper comes into direct contact with the metal plate, so that the design property of the decorative plate tends to be deteriorated when applying a high temperature and a high pressure thereto. In particular, in the case of decorative plates having a woodgrain pattern, there tends to arise such a problem that expression of a difference in gloss such as contrast between a grain portion and a vessel portion of the woodgrain pattern is hardly achieved.

The present invention has been made in view of the above conventional problems. An object of the present invention is to provide a high-pressure melamine resin decorative plate which is free from deterioration in design property of a decorative sheet even when applying a high temperature and a high pressure thereto during a process for production thereof.

As a result of intensive and extensive researches to achieve the above object, the inventors have found that the above problems can be overcome by using a decorative sheet having a low-gloss pattern ink layer and a surface protective layer which is formed by crosslinking and curing an ionizing radiation-curable resin composition. The present invention has been accomplished on the basis of the finding.

Thus, the present invention provides:

(1) A high-pressure melamine resin decorative plate comprising a decorative sheet, a melamine resin-impregnated paper and a core layer which is produced by successively laminating the melamine resin-impregnated paper and the core layer on a back surface of the decorative sheet and then subjecting the resultant laminated structure to heat- and press-molding, wherein the decorative sheet comprises at least a substrate, a low-gloss pattern ink layer partially formed on the substrate, and a surface protective layer which is present on and contacted with the low-gloss pattern ink layer so as to cover a whole surface including both a region where the low-gloss pattern ink layer is formed and a region where no low-gloss pattern ink layer is formed; the surface protective layer is formed by crosslinking and curing an ionizing radiation-curable resin composition, and provided therein with a low-gloss region which is located in a portion just above the low-gloss pattern ink layer and in the vicinity of the portion and visually recognized as a concave portion.

(2) A high-pressure melamine resin decorative plate comprising a decorative sheet, a melamine resin-impregnated paper and a core layer which is produced by successively laminating the melamine resin-impregnated paper and the core layer on a back surface of the decorative sheet and then subjecting the resultant laminated structure to heat- and press-molding, wherein the decorative sheet comprises at least a substrate, a low-gloss pattern ink layer partially formed on the substrate, and a surface protective layer which is present on and contacted with the low-gloss pattern ink layer so as to cover a whole surface including both a region where the low-gloss pattern ink layer is formed and a region where no low-gloss pattern ink layer is formed; the surface protective layer is formed by crosslinking and curing an ionizing radiation-curable resin composition; a low-gloss pattern ink forming the low-gloss pattern ink layer contains a non-crosslinked urethane resin as a binder; and the ionizing radiation-curable resin composition contains a (meth)acrylate monomer.

(3) The high-pressure melamine resin decorative plate as defined in the above aspect (2), wherein the low-gloss pattern ink forming the low-gloss pattern ink layer contains the non-crosslinked urethane resin and an unsaturated polyester resin as a binder.

(4) The high-pressure melamine resin decorative plate as defined in the above aspect (2) or (3), wherein the ionizing radiation-curable resin composition is constituted of the (meth)acrylate monomer solely.

(5) The high-pressure melamine resin decorative plate as defined in any one of the above aspects (1) to (4), wherein the ionizing radiation-curable resin composition is an electron beam-curable resin composition.

(6) The high-pressure melamine resin decorative plate as defined in any one of the above aspects (1) to (5), wherein at least a pattern layer is laminated on the substrate, and the low-gloss pattern ink layer and the surface protective layer which is present on and contacted with the low-gloss pattern ink layer so as to cover a whole surface including both a region where the low-gloss pattern ink layer is formed and a region where no low-gloss pattern ink layer is formed, are successively formed on the pattern layer.

(7) The high-pressure melamine resin decorative plate as defined in the above aspect (6), wherein the pattern layer has a woodgrain pattern, and the low-gloss pattern ink layer forms a low -gloss region corresponding to a vessel portion of the woodgrain pattern.

EFFECT OF THE INVENTION

In accordance with the present invention, there is provided a high-pressure melamine resin decorative plate which is free from deterioration in design property of a decorative sheet even when applying a high temperature and a high pressure thereto during a process for production thereof.

BRIEF EXPLANATION OF REFERENCE NUMERALS

1: High-pressure melamine resin decorative plate; 2: Decorative sheet; 3: Melamine resin-impregnated paper; 4: Core layer; 21: Substrate; 22: Low-gloss pattern ink layer; 23: Low-gloss region; 24: Surface protective layer; 25: Colored layer; 26: Pattern layer; 27: Penetration-preventing layer; 28: Convex shape

DETAILED DESCRIPTION OF THE INVENTION

Figure 1:
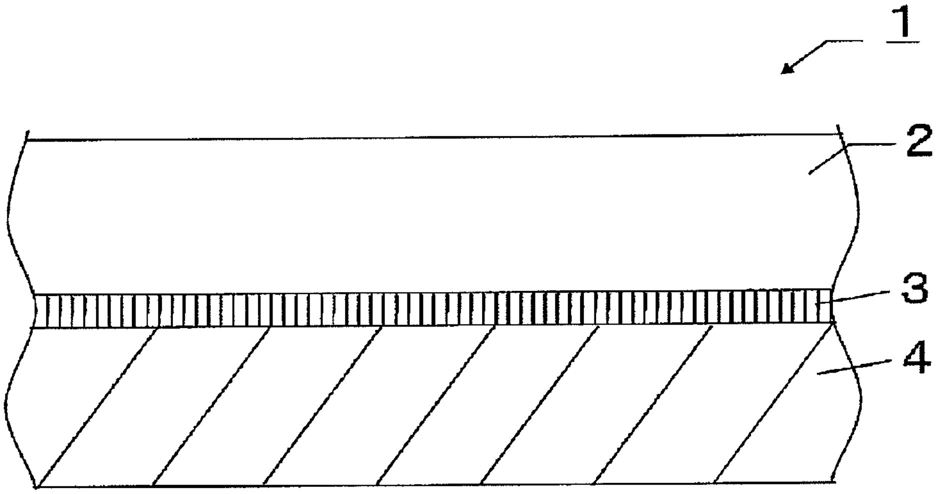
FIG. 1 is a schematic view showing a section of a decorative plate according to the present invention.
Figure 2:
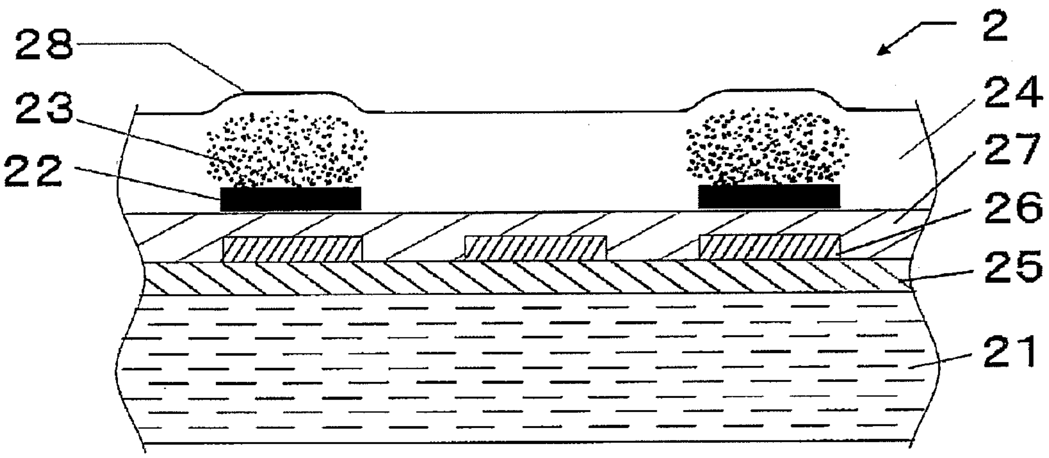
FIG. 2 is a schematic view showing a section of a decorative sheet used in the decorative plate according to the present invention.

The construction of the high-pressure melamine resin decorative plate according to the present invention is described by referring to FIGS. 1 and 2. As shown in FIG. 1, the high-pressure melamine resin decorative plate 1 of the present invention is formed by successively laminating a melamine resin-impregnated paper 3 and a core layer 4 on a back surface of a decorative sheet 2 in this order and then subjecting the resultant laminated structure to heat- and press-molding.

The present invention is characterized by using as the decorative sheet 2, a decorative sheet having a low-gloss pattern ink layer and a surface protective layer formed by crosslinking and curing an ionizing radiation-curable resin composition. Meanwhile, the back surface of the decorative sheet 2 as described herein means a substrate-side surface of the decorative sheet 2.

In the followings, the decorative sheet used in the present invention is described in detail by referring to FIG. 2. FIG. 2 is a schematic view showing a section of the decorative sheet 2 used in the decorative plate according to the present invention.

The decorative sheet 2 used in the present invention includes at least a substrate 21, a low-gloss pattern ink layer 22 partially formed on the substrate, and a surface protective layer 24 which is present on and contacted with the low-gloss pattern ink layer so as to cover a whole surface including both a region where the low-gloss pattern ink layer is formed and a region where no low-gloss pattern ink layer is formed, wherein the surface protective layer 24 is formed by crosslinking and curing an ionizing radiation-curable resin composition, and provided therein with a low-gloss region which is located in a portion just above the low-gloss pattern ink layer and in the vicinity of the portion and visually recognized as a concave portion.

In the embodiment of the decorative sheet as shown in FIG. 2, a colored layer 25 uniformly covered over a whole surface of the substrate 21, a pattern layer 26, a uniform penetration preventing layer 27, the low-gloss pattern ink layer 22 and the surface protective layer 24 formed by crosslinking and curing an ionizing radiation-curable resin composition are laminated on the substrate 2 in this order. The low-gloss pattern ink layer 22 is partially formed, and a portion of the surface protective layer located just above the low-gloss pattern ink layer or in the vicinity thereof is provided with a low-gloss region 23. When the decorative sheet and the high-pressure melamine resin decorative plate 1 obtained after the heat- and press-molding are viewed from the side of the surface protective layer 24, the low-gloss region 23 is visually recognized as a concave portion while the other region is visually recognized as a convex portion, so that a convexo-concave pattern is recognized as a whole on the surface of the decorative sheet by the presence of the low-gloss region 23. Meanwhile, in the drawings, the low-gloss region 23 is represented by collection of points.

An outermost surface of the surface protective layer 24 which is located above the low-gloss region 23 may be raised up owing to formation of the low-gloss pattern ink layer 22, and may form a convex shape 28. When such a convex shape is present on the surface of the surface protective layer 24, light scattering occurs thereon due to increase of the surface area, and an angle of visibility for recognizing the low gloss is also widened, thereby further emphasizing a visual convexo-concave feeling in cooperation with the effect of the low gloss region 23. Meanwhile, the height of the convex shape is not particularly limited as long as the effects of the present invention can be suitably exhibited, and is usually in the range of from 2 to 3 μm.

The extent of spread of the low-gloss region 23 formed in the surface protective layer 24 is not particularly limited as long as the effects of the present invention can be suitably exhibited. As shown in FIG. 2, the low-gloss region 23 may extend from the surface of the low-gloss pattern ink layer 22 in the thickness direction of the surface protective layer 24 and terminate at the mid thereof. Alternatively, the low-gloss region 23 may reach the outermost surface of the surface protective layer 24.

The substrate 21 used in the decorative sheet 2 according to the present invention is not particularly limited as long as it is made of a material capable of allowing a melamine resin impregnated in the melamine resin-impregnated paper 3 to penetrate thereinto during the process for production of the melamine resin decorative plate. Examples of the material used for the substrate 21 include thin cut sheet papers, kraft papers, titanium papers, coated papers, art papers, parchment papers, glassine papers, paraffin papers and Japanese papers. Among these materials, especially preferred are those having a high hiding power such as titanium papers.

The thickness of the substrate 21 may be adjusted such that the basis weight thereof is preferably from 30 to 80 g/m$^2$ and more preferably from 50 to 60 g/m$^2$ in view of a good penetrability of the melamine resin thereinto as well as a good hiding power thereof.

The colored layer 25 as shown in FIG. 2 which is formed so as to cover a whole surface of the substrate may be optionally provided for enhancing a design property of the decorative plate according to the present invention, and may also be referred to as a concealing layer or a whole solid layer. Thus, the colored layer 25 serves for adjusting a color of a surface of the substrate 21, and is formed for coloring the surface of the substrate 21 as intended when the substrate 21 is unsuitably colored by itself or exhibits an uneven color. The colored layer usually has an opaque color in many cases, but may also show a tinted transparent color to utilize an original pattern of the underlying layer. In the case where a white color of the substrate 21 is utilized or the substrate 21 itself is suitably tinted, it is not required to provide the colored layer 25.

The ink used for forming the colored layer may be those produced by appropriately mixing a binder with a colorant such as pigments and dyes, an extender pigment, a solvent, a stabilizer, a plasticizer, a catalyst and a hardening agent. The binder is not particularly limited. Examples of the binder include polyurethane-based resins, vinyl chloride/vinyl acetate-based copolymer resins, vinyl chloride/vinyl acetate/acrylic compound-based copolymer resins, chlorinated polypropylene-based resins, acrylic resins, polyester-based resins, polyamide-based resins, butyral-based resins, polystyrene-based resins, nitrocellulose-based resins and cellulose acetate-based resins. The binder may be optionally selected from these resins, and these resins may be used alone or in the form of a mixture of any two or more thereof.

The colorant is preferably an inorganic or organic pigment having an excellent durability which is free from discoloration upon being subjected to heat-pressing process. Specific examples the colorant include inorganic pigments such as chrome yellow, cadmium yellow, yellow iron oxide, titanium oxide, Berlin blue, carbon black and iron oxide red; and organic pigments such as disazo-based pigments, isoindolinone, polyazo pigments, quinacridone and phthalocyanine blue. Further, as the colorant, there may also be used nacreous (pearl) pigments such as aluminum powders, copper powders, fine cut pieces of metal-deposited synthetic resin films, titanium dioxide-coated mica and scale-like foil pieces, etc.

The thickness of the colored layer 25 is from about 1 to about 20 μm, and a so-called solid printing layer may be suitably used as the colored layer 25.

In addition, the ink used for forming the colored layer may contain an extender pigment such as silica, barium sulfate, kaolin, talc and calcium carbonate in order to enhance an interlaminar adhesion of the ink coating film and a penetrability of the thermosetting resin into the ink.

The colored layer may be formed by any suitable printing method including ordinary rotary press printing such as gravure printing, flexographic printing and silk screen printing, as well as sheet-feed press printing. Among these printing methods, preferred is a gravure rotary press printing which is capable of employing a binder of ink selected from a wide range of binders of inks, and hardly gives an adverse influence on the impregnation step for the thermosetting resin.

The pattern layer 26 shown in FIG. 2 serves for imparting a decorative design to the decorative plate 1 of the present invention, and is formed by printing various patterns with an ink using a printer. Examples of the patterns formed by the pattern layer 26 include woodgrain patterns, stone-grain patterns imitating the surface of rocks such as marble pattern (e.g., travertine marble pattern), cloth patterns imitating texture of cloth and fabric, tiling patterns, brick work patterns, and composite patterns thereof such as parquetry patterns and patchwork patterns. These patterns may be produced by ordinary multi-color printing with a process color including yellow, red, blue and black colors, or by multi-color printing with a special color using printing plates corresponding to individual colors of the pattern.

The pattern ink used for forming the pattern layer 26 may be the same as the ink used for forming the colored layer 25. Meanwhile, in the decorative plate of the present invention, since the low-gloss pattern ink layer 22 and the low-gloss region 23 as described in detail below are capable of imparting a decorative design thereto, the provision of the pattern layer 26 is not necessarily essential.

The penetration-preventing layer 27 shown in FIG. 2 may be optionally provided, and has a function of inhibiting penetration of a low-gloss pattern ink used for forming the below-mentioned low-gloss pattern ink layer 22 and an ionizing radiation-curable resin for forming the below-mentioned surface protective layer 24 into the substrate 21. Therefore, the penetration-preventing layer 27 may be formed between the substrate 21 and the low-gloss pattern ink layer 22, for example, between the substrate 21 and the colored layer 25, between the colored layer 25 and the pattern layer 26 or between the pattern layer 26 and the low-gloss pattern ink layer 22 as shown in FIG. 2. As the penetration-preventing layer 27, a uniform layer obtained by crosslinking and curing a curable resin which exhibits a good adhesion to the ionizing radiation-curable resin forming the surface protective layer 24 is usually provided between the pattern layer 26 and the low-gloss pattern ink layer 22 as shown in FIG. 2, thereby not only allowing the surface of the colored layer 25, the pattern layer 26, etc., if formed on the substrate 21, to be smoothened, but also exhibiting the effect of enhancing a bonding strength of these layers to the low-gloss pattern ink layer 22 and the surface protective layer 24.

In the decorative sheet 2 used in the present invention, the low-gloss pattern ink layer 22 may be directly laminated on the substrate 21, or may be laminated on the colored layer 25, the pattern layer 26, the penetration-preventing layer 27, etc., which may be optionally provided on the substrate. The low-gloss pattern ink layer 22 serves for generating the difference in gloss of the pattern.

The low-gloss pattern ink forming the low-gloss pattern ink layer 22 has a property capable of interacting with the ionizing radiation-curable resin composition for forming the surface protective layer 24 to cause elution, dispersion and mixing therebetween, and therefore may be appropriately selected in view of the relation with the (uncured) ionizing radiation-curable resin composition. More specifically, the low-gloss pattern ink preferably contains a non-crosslinkable resin as a binder resin. Examples of the suitable binder resin of the ink include thermoplastic (non-crosslinked type) urethane resins. The content of the urethane resin in the low-gloss pattern ink is preferably 50% by mass or more in view of enhancing an interaction with the ionizing radiation-curable resin composition forming the surface protective layer 24 and thereby attaining a higher difference in gloss in the pattern.

The urethane resin is preferably selected from non-crosslinked type urethane resins, i.e., thermoplastic urethane resins having not a three-dimensionally crosslinked network steric molecular structure but a linear molecular structure. Examples of such non-crosslinked type urethane resins include those urethane resins produced by reacting a polyol component such as acrylic polyols, polyester polyols and polyether polyols, with an isocyanate component such as aromatic isocyanates, e.g., tolylenediisocyanate, xylenediisocyanate and diphenylmethanediisocyanate, and aliphatic or alicyclic isocyanates, e.g., isophoronediisocyanate, hexamethylenediisocyanate and hydrogenated tolylenediisocyanate. The average number of hydroxyl groups in one polyol molecule and the average number of isocyanate groups in one isocyanate molecule are respectively 2. The urethane resin, preferably has an average molecular weight of from about 10,000 to about 50,000 and a glass transition temperature (Tg) of from −70 to −40° C. in view of forming a suitable low-gloss region.

In addition, the low-gloss pattern ink may also contain, if required, saturated or unsaturated polyester resins, acrylic resins or vinyl chloride/vinyl acetate copolymers in order to adjust the extent of formation of the low-gloss region and the contrast of difference in gloss between the low-gloss region and surrounding portions thereof. Among these optional resin components, preferred are polyester resins, and more preferred are unsaturated polyester resins. The amount of the unsaturated polyester resin added is preferably from 10 to 50% by mass on the basis of the whole amount of the binder contained in the low-gloss pattern ink. When the amount of the unsaturated polyester resin added lies within the above specified range, a sufficient effect of promoting formation of the low-gloss region can be attained. The unsaturated polyester resin is not particularly limited as long as it is a reaction product of an unsaturated dicarboxylic acid and a glycol. Examples of the unsaturated dicarboxylic acid include maleic acid, fumaric acid and itaconic acid. Examples of the glycol include ethylene glycol, diethylene glycol, propylene glycol and butylene glycol.

The low-gloss pattern ink forming the low-gloss pattern ink layer 22 may contain a colorant similarly to those ink compositions used for forming the cored layer 25 and the pattern layer 26 to provide a design pattern by itself. However, in the case where the colored layer 25 and the pattern layer 26 are formed as shown in FIG. 2, since the substrate 21 is already imparted with hues and patterns by these layers, the low-gloss pattern ink composition forming the low-gloss pattern ink layer 22 is not necessarily required to contain the colorant for tinting the layer. More specifically, when the pattern layer 26 is formed, the low-gloss pattern ink layer 22 is coordinated with a portion of the pattern expressed by the pattern layer 26 which is to be delustered and visually recognized as a concave portion, thereby obtaining a pattern having the portion visually recognized as a concave portion due to the difference in gloss. For example, if a woodgrain pattern is to be expressed by the pattern layer 26, the ink portion of the low-gloss pattern ink layer 22 is coordinated with a vessel portion of the woodgrain pattern, thereby obtaining such a pattern in which the vessel portion is visually recognized as a concave portion due to the difference in gloss. In addition, when a tiling pattern is to be expressed by the pattern layer 26, the ink portion of the low-gloss pattern ink layer 22 is coordinated with a grooved joint portion of the tiling, thereby obtaining such a pattern in which the grooved joint portion is visually recognized as a concave portion due to the difference in gloss.

Further, the low-gloss pattern ink composition for forming the low-gloss pattern ink layer 22 preferably contains an extender pigment. The inclusion of the extender pigment allows the low-gloss pattern ink composition to exhibit a thixotropic property. As a result, when printing the low-gloss pattern ink layer 22 using a printing plate, the shape of the low-gloss pattern ink composition applied thereto can be maintained, so that a sharpness of the convexo-concave shape at an end portion at which transition between convex and concave portions occurs, can be emphasized, thereby enabling sharp expression of the design pattern.

The extender pigment used in the present invention is not particularly limited, and may be appropriately selected from silica, talc, clay, barium sulfate, barium carbonate, calcium sulfate, calcium carbonate, magnesium carbonate, etc. Among these extender pigments, preferred is silica because the silica has a high freedom of selection of material as to oil absorption, particle size and pore volume and is excellent in designing property, whiteness and coating stability as an ink, and more preferred is a silica powder. The average particle size of silica is preferably from 0.1 to 5 μm. The ink containing silica having an average particle size of 0.1 μm or larger is prevented from exhibiting an extremely high thixotropic property and a too high viscosity, so that a printing operation using the ink can be readily controlled. Also, when it is intended to express the vessel pattern as a delustered portion, if the particle size of silica is smaller than a thickness of the ink coating layer of the vessel pattern portion which is usually 5 μm or smaller, protrusion of the silica particles on a surface of the ink coating layer is relatively suppressed and the protruded particles are unnoticeable, thereby preventing occurrence of visually strange feeling.

The content of the extender pigment in the low-gloss pattern ink composition is preferably, in the range of from 5 to 15% by mass. The low-gloss pattern ink composition containing the extender pigment in an amount of 5% by mass or more can exhibit a sufficient thixotropic property, whereas the low-gloss pattern ink composition containing the extender pigment in an amount of 15% by mass or less is completely free from deterioration in the effect of imparting a low gloss.

Meanwhile, the method of measuring the average particle size is not particularly limited, and the average particle size may be measured by any known method such as a laser diffraction method, a Coulter counter method and a precipitation method.

The coating amount of the low-gloss pattern ink for forming the low-gloss pattern ink layer 22 is preferably in the range of from 1 to 30 g/m$^2$. When the coating amount of the low-gloss pattern ink is 1 g/m$^2$ or more, the above-described interaction between the low-gloss pattern ink and the ionizing radiation-curable resin composition suitably takes place to form a sufficient amount of the low-gloss region 23, thereby producing a sufficient difference in gloss on the surface of the resultant decorative plate. On the other hand, when the coating amount of the low-gloss pattern ink is 30 g/m$^2$ or less, the printing with the low-gloss pattern ink can be made without any mechanical limitations, resulting in economical advantages. From these viewpoints, the coating amount of the low-gloss pattern ink is more preferably from 2 to 20 g/m$^2$ and still more preferably from 5 to 10 g/m$^2$.

Further, by varying the coating amount of the low-gloss pattern ink composition, the obtained low-gloss pattern ink layer 22 has an uneven ink thickness, thereby allowing the extent of the portion visually recognized as a concave portion to be stepwise or continuously changed. As a result, the obtained decorative plate can exhibit a gradation pattern with the difference in gloss which is changed stepwise, or a continuous pattern with the difference in gloss which is changed continuously.

The reason therefor is considered to be that as the coating amount of the low-gloss pattern ink layer 22 is relatively increased, the interaction between the low-gloss pattern ink layer 22 and the surface protective layer 24 is relatively enhanced, so that the extent of a suspended condition between the layers is increased, thereby further lowering the gloss of the low-gloss region 23. Such a method allows the resultant decorative plate to exhibit further various textures.

The thickness of the ink forming the low-gloss pattern ink layer 22 may be readily varied usually by changing the coating amount of the ink. When the coating amount of the ink is continuously varied, the gloss of the pattern may be changed not stepwise but continuously.

The surface protective layer 24 is formed by crosslinking and curing the ionizing radiation-curable resin composition as described above. The ionizing radiation-curable resin composition used herein means a resin composition having energy quanta capable of crosslinking and polymerizing molecules thereof when exposed to electromagnetic wave or charged particle beam, namely such a resin composition capable of undergoing crosslinking and curing reactions upon irradiating an ultraviolet ray or an electron beam thereto. More specifically, the ionizing radiation-curable resin composition may be appropriately selected from polymerizable monomers and polymerizable oligomers or prepolymers thereof which are conventionally used as an ionizing radiation-curable resin composition.

Typical examples of the suitable polymerizable monomers include (meth)acrylate monomers containing a radical-polymerizable unsaturated group in a molecule thereof. When such a (meth)acrylate monomer is contained in the ionizing radiation-curable resin composition, the above interaction with the low-gloss pattern ink can be exhibited, resulting in occurrence of suitable difference in gloss of the pattern. In order to attain a stronger interaction with the low-gloss pattern ink and attain a larger difference in gloss, the content of the (meth)acrylate monomer in the ionizing radiation-curable resin composition is preferably 50% by mass or larger, and the ionizing radiation-curable resin composition is more preferably made of the (meth)acrylate monomer solely.

The (meth)acrylate monomers are preferably polyfunctional (meth)acrylates. Meanwhile, the term "(meth)acrylate" used herein means an acrylate, a methacrylate or both thereof. The polyfunctional (meth)acrylates are not particularly limited as long as they have two or more ethylenically unsaturated bonds in a molecule thereof. Specific examples of the polyfunctional (meth)acrylates include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol di(meth)acrylate hydroxypivalate, dicyclopentenyl di(meth)acrylate, caprolactone-modified dicyclopentenyl di(meth)acrylate, ethyleneoxide-modified phosphoric acid di(meth)acrylate, allylated cyclohexyl di(meth)acrylate, isocyanurate di(meth)acrylate, trimethylolpropane tri(meth)acrylate, ethyleneoxide-modified trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, tris(acryloxyethyl) isocyanurate, propionic acid-modified dipentaerythritol penta(meth)acrylate, dipentaerythritol hexa(meth)acrylate, ethyleneoxide-modified dipentaerythritol hexa(meth)acrylate and caprolactone-modified dipentaerythritol hexa(meth)acrylate. These polyfunctional (meth)acrylates may be used alone or in combination of any two or more thereof.

In the present invention, for the purpose of reducing a viscosity of the polyfunctional (meth)acrylate, a monofunctional (meth)acrylate may be appropriately used in combination with the polyfunctional (meth)acrylate unless the effects of the present invention are adversely affected. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate and isobornyl (meth)acrylate. These monofunctional (meth)acrylates may be used alone or in combination of any two or more thereof.

As the polymerizable oligomer, there may be used those oligomers having a radical-polymerizable unsaturated group in a molecule thereof. Examples of the polymerizable oligomers include epoxy (meth)acrylate-based oligomers, urethane (meth)acrylate-based oligomers, polyester (meth)acrylate-based oligomers and polyether (meth)acrylate-based oligomers. The epoxy (meth)acrylate-based oligomers may be produced, for example, by esterifying an oxirane ring of a relatively low-molecular weight bisphenol-type epoxy resin or novolak-type epoxy resin with (meth)acrylic acid. In addition, there may also be used carboxyl-modified epoxy (meth)acrylate oligomers obtained by partially modifying the above epoxy (meth)acrylate-based oligomers with a dibasic carboxylic anhydride. The urethane (meth)acrylate-based oligomers may be produced, for example, by esterifying a polyurethane oligomer obtained by reacting a polyether polyol or a polyester polyol with polyisocyanate, with (meth)acrylic acid. The polyester (meth)acrylate-based oligomers may be produced, for example, by esterifying a hydroxyl group of a polyester oligomer having hydroxyl groups at both terminal ends thereof which is obtained by condensation between a polycarboxylic acid and a polyhydric alcohol, with (meth)acrylic acid, or by esterifying a terminal hydroxyl group of an oligomer obtained by adding an alkyleneoxide to a polycarboxylic acid, with (meth)acrylic acid. The polyether (meth)acrylate-based oligomers may be produced, for example, by esterifying a hydroxyl group of a polyether polyol with (meth)acrylic acid.

Examples of the other polymerizable oligomers include polybutadiene (meth)acrylate-based oligomers having a high hydrophobic property which is in the form of a polybutadiene oligomer having a (meth)acrylate group in a side chain thereof; silicone (meth)acrylate-based oligomers having a polysiloxane bond in a main chain thereof; aminoplast resin (meth)acrylate-based oligomers obtained by modifying an aminoplast resin having a large number of reactive groups in a small molecule thereof; and oligomers having a cation-polymerizable functional group in a molecule thereof such as a novolak-type epoxy resin, a bisphenol-type epoxy resin, an aliphatic vinyl ether and an aromatic vinyl ether.

In the present invention, it is important that the low-gloss pattern ink for forming the low-gloss pattern ink layer 22 and the ionizing radiation-curable resin composition for forming the surface protective layer 24 are interacted with each other. Therefore, the suitable ink and ionizing radiation-curable resin composition are selected in view of good interaction therebetween. The ionizing radiation-curable resin composition preferably contains a polyfunctional (meth)acrylate monomer.

In addition, the ionizing radiation-curable resin used in the surface protective layer 24 preferably contains an ethyleneoxide-modified polymerizable compound, and the surface protective layer preferably contains baked kaolin particles. The inclusion of the ethyleneoxide-modified polymerizable compound in the ionizing radiation-curable resin allows the resultant surface protective layer to exhibit an improved oil resistance, and the inclusion of the baked kaolin particles in the surface protective layer allows the layer to exhibit an improved marring resistance. More specifically, as to the oil resistance, when the surface protective layer is constituted of the ionizing radiation-curable resin containing the ethyleneoxide-modified polymerizable compound, an affinity of the surface protective layer to oils can be lowered owing to a hydrophilic property of an ethyleneoxide moiety of the compound. As a result, oils such as edible oils which are attached onto the surface protective layer are prevented from being penetrated into the surface protective layer, thereby allowing the resultant decorative plate to be improved in oil resistance by the effect of the surface protective layer itself.

The ethyleneoxide-modified polymerizable compound is such a compound which is capable of undergoing a polymerization reaction when exposed to an ionizing radiation, and contains an ethyleneoxide-modified moiety. The suitable ethyleneoxide-modified polymerizable compound may be appropriately used according to applications of the decorative plate. Specific examples of the ethyleneoxide-modified polymerizable compound include trimethylolpropane ethyleneoxide-modified tri(meth)acrylate and bisphenol A ethyleneoxide-modified di(meth)acrylate.

With the increase in chain number n (per molecule) of ethyleneoxide repeating units in the ethyleneoxide-modified moiety, the oil resistance of the surface protective layer is increased, but on the contrary, the surface protective layer is deteriorated in water resistance and stain resistance to aqueous contaminants such as water-based inks due to the increased hydrophilicity. Therefore, the chain number n of ethyleneoxide repeating units in the ethyleneoxide-modified moiety may be appropriately adjusted in view of good balance between these properties. For example, the chain number n of ethyleneoxide repeating units in the ethyleneoxide-modified moiety is preferably from 2 to 20 and more preferably from 4 to 15. Meanwhile, the ethyleneoxide-modified polymerizable compound may be a difunctional, trifunctional or other polyfunctional compound, for example, a tetra- or higher functional compound. The functionality of the ethyleneoxide-modified polymerizable compound may be appropriately determined according to hardness of the coating film or the like as required for the surface protective layer.

In the ionizing radiation-curable resin used in the surface protective layer 24, a whole amount of the resin components capable of undergoing a polymerization reaction when exposed to an ionizing radiation may be constituted of the ethyleneoxide-modified polymerizable compound. However, in view of other properties than oil resistance, for example, stain resistance to water-based inks on the surface of the surface protective layer, etc., the other ionizing radiation-polymerizable compounds may be appropriately used in combination with the ethyleneoxide-modified polymerizable compound. More specifically, when the ionizing radiation-curable resin is composed of the ethyleneoxide-modified polymerizable compound solely, the surface protective layer is enhanced in oil resistance owing to the increased hydrophilicity, but tends to be deteriorated in stain resistance to aqueous contaminants such as water-based inks owing to increased affinity to aqueous substances. In such a case, a non-hydrophilic polymerizable compound, for example, an ethyleneoxide-modified acrylate monomer and/or a prepolymer thereof (ordinary acrylate monomer and/or its prepolymer) may be blended with the ethyleneoxide-modified polymerizable compound. In order to attain both the oil resistance and the stain resistance to aqueous contaminants, the blending ratio (mass ratio) of the ethyleneoxide-modified polymerizable compound to the ethyleneoxide-unmodified polymerizable compound is preferably in the range of from 3/7 to 5/5. Although propyleneoxide belongs to alkyleneoxide compounds similarly to the ethyleneoxide, if the propyleneoxide-modified compound is used in place of the ethyleneoxide-modified compound, the relative ratio of ether bonds contained in the ionizing radiation-curable resin tends to be reduced, and the tendency of increase in hydrophilicity is lowered, thereby failing to obtain a good oil resistance.

When an ultraviolet-curable resin composition is used as the ionizing radiation-curable resin composition, a photopolymerization initiator is preferably added thereto in an amount of from about 0.1 to about 5 parts by mass on the basis of 100 parts by mass of the resin composition. The photopolymerization initiator may be appropriately selected from conventionally used ones without particular limitations. Examples of the photopolymerization initiator used for polymerizable monomers or polymerizable oligomers containing a radical-polymerizable unsaturated bond in a molecule thereof include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenyl acetophenone, 2,2-diethoxy-2-phenyl acetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenyl benzophenone, 4,4'-diethylaminobenzophenone, dichlorobenzophenone, 2-methyl anthraquinone, 2-ethyl anthraquinone, 2-tert-butyl anthraquinone, 2-aminoanthraquinone, 2-methyl thioxanthone, 2-ethyl thioxanthone, 2-chlorothioxanthone, 2,4-dimethyl thioxanthone, 2,4-diethyl thioxanthone, benzyl dimethyl ketal and acetophenone dimethyl ketal.

Examples of the photopolymerization initiator used for polymerizable oligomers containing a cation-polymerizable functional group in a molecule thereof, etc., include aromatic sulfonium salts, aromatic diazonium salts, aromatic iodonium salts, metallocene compounds, and benzoin sulfonic esters.

Also, examples of a photosensitizer usable in the ionizing radiation-curable resin composition include p-dimethyl benzoate, tertiary amines and thiol-based sensitizers.

In the present invention, an electron beam-curable resin composition is preferably used as the ionizing radiation-curable resin composition. The electron beam-curable resin composition can be used under a solvent-free condition and is therefore favorable in view of environmental protection and human health, and further can exhibit a stable curing property without requiring any photopolymerization initiator.

The ionizing radiation-curable resin composition used in the present invention may also contain various additives according to required properties of the obtained cured resin layer. Examples of the additives include weather resistance-improving agents, abrasion resistance-improving agents, polymerization inhibitors, crosslinking agents, infrared-absorbing agents, antistatic agents, adhesion-improving agents, leveling agents, thixotropic agents, coupling agents, plasticizers, antifoaming agents, fillers, solvents and colorants.

As the weather resistance-improving agents, there may be used ultraviolet-absorbing agents or light stabilizers. The ultraviolet absorbing agents may be either inorganic or organic compounds. As the preferred inorganic ultraviolet absorbing agents, there may be used particles of titanium dioxide, cerium oxide or zinc oxide which have an average particle size of from about 5 to about 120 nm. As the organic weather resistance-improving agents, there may be used benzotriazole-based compounds. Specific examples of the benzotriazole-based compounds include 2-(2-hydroxyl-5-methylphenyl)benzotriazole, 2-(2-hydroxy-3,5-di-tert-aminophenyl)benzotriazole and 3-[3-(benzotriazol-2-yl)-5-tert-butyl-4-hydroxyphenyl]propionic ester of polyethylene glycol. Also, examples of the light stabilizer include hindered amine-based compounds. Specific examples of the light stabilizer include bis(1,2,2,6,6-pentamethyl-4-piperidyl) 2-(3,5-di-tert-butyl-4-hydroxybenzyl)-2'-n-butyl malonate, bis(1,2,2,6,6-pentamethyl-4-piperidyl)sebacate and tetrakis(2,2,6,6-tetramethyl-4-piperidyl)-1,2,3,4-butanetetracarboxylate. In addition, as the ultraviolet absorbing agent or the light stabilizer, there may also be used reactive ultraviolet absorbing agents or reactive light stabilizers having a polymerizable group such as a (meth)acryloyl group in a molecule thereof.

Examples of the inorganic abrasion resistance-improving agent include spherical particles of α-alumina, silica, kaolinite, iron oxide, diamond and silicon carbide. The inorganic abrasion resistance-improving agent may be of a spherical shape, an ellipsoidal shape, a polyhedral shape or a scale-like shape. Among these shapes, preferred is the spherical shape although not particularly limited thereto. Examples of the organic abrasion resistance-improving agent include beads of synthetic resins such as crosslinked acrylic resins and polycarbonate resins. The particle size of the abrasion resistance-improving agent may be usually from about 30 to about 200% of a thickness of the cure resin layer. Among these abrasion resistance-improving agents, spherical α-alumina particles are especially preferred because of high hardness, large effect of improving the abrasion resistance and relatively easy production of spherical particles thereof.

Examples of the polymerization inhibitor include hydroquinone, p-benzoquinone, hydroquinone monomethyl ether, pyrogallol and t-butyl catechol. Examples of the crosslinking agent include polyisocyanate compounds, epoxy compounds, metal chelate compounds, aziridine compounds and oxazoline compounds.

Examples of the filler include barium sulfate, talc, clay, calcium carbonate and aluminum hydroxide.

Examples of the colorant include known coloring pigments such as quinacridone red, isoindolinone yellow, phthalocyanine blue, phthalocyanine green, titanium oxide and carbon black.

Examples of the infrared-absorbing agent include dithiol-based metal complexes, phthalocyanine-based compounds and diimmonium compounds.

In the present invention, the above polymerizable monomers or polymerizable oligomers as the ionizing radiation-curable component and various additives are intimately mixed with each other at a given mixing ratio to prepare a coating solution composed of the ionizing radiation-curable resin composition. The viscosity of the coating solution is not particularly limited, and may be determined so as to form a suitable cured resin layer on a surface of the substrate by the below-mentioned coating method.

In the present invention, the thus prepared coating solution is applied onto a surface of the substrate in an amount capable of providing a cured coating layer having a thickness of 1 to 20 μm, by known methods such as gravure coating, bar coating, roll coating, reverse roll coating and Komma coating, preferably gravure coating, thereby forming an uncured resin layer thereon. The cured coating layer having a thickness of 1 μm or larger can exhibit good functions as required. The thickness of the cured surface protective layer is preferably from about 2 to about 20 μm.

In the present invention, the thus formed uncured resin layer is irradiated with an ionizing radiation such as an electron beam and an ultraviolet ray to cure the uncured resin layer. When an electron beam is used as the ionizing radiation, an acceleration voltage for the electron beam may be appropriately determined according to the kind of resin used and the thickness of the resin layer, and the uncured resin layer is preferably cured by applying an acceleration voltage of usually about 70 to about 300 kV thereto.

Meanwhile, upon irradiation of the electron beam, the higher the acceleration voltage becomes, the higher the penetrability of the electron beam can be attained. Therefore, when using a substrate which tends to be deteriorated by exposure to the electron beam, the acceleration voltage may be controlled such that the depth of penetration of the electron beam is substantially identical to the thickness of the resin layer, thereby inhibiting an excessive amount of the electron beam from being irradiated to the substrate and minimizing deterioration of the substrate by irradiation with an excessive amount of the electron beam.

The exposure dose of the electron beam is preferably such an amount capable of saturating a crosslinking density of the resin layer, and may be selected from the range of usually 5 to 300 kGy (0.5 to 30 Mrad) and preferably 10 to 50 kGy (1 to 5 Mrad).

The electron beam source is not particularly limited, and examples of the electron beam source usable in the present invention include various electron beam accelerators such as Cockroft-Walton type, van de Graaff type, resonance transformer type, insulating core transformer type, linear type, Dynamitron type and high-frequency type.

When an ultraviolet ray is used as the ionizing radiation, the ultraviolet ray to be irradiated may have a wavelength of 190 to 380 nm. The ultraviolet ray source is not particularly limited, and examples of the ultraviolet ray source usable in the present invention include a high-pressure mercury lamp, a low-pressure mercury lamp, a metal halide lamp and a carbon arc lamp.

The thus formed cured resin layer may also contain various additives to impart various functions or performances thereto. Examples of the various functions include those capable of attaining a high hardness and a good marring resistance such as functions of so-called hard coat, anti-fogging coat, anti-fouling coat, anti-glare coat, anti-reflecting coat, ultraviolet-shielding coat and infrared-shielding coat.

The melamine resin-impregnated paper used in the decorative plate of the present invention may be formed by impregnating a melamine resin into an adequate paper. Examples of the melamine resin-impregnated paper include overlay papers conventionally used.

The thickness of the melamine resin-impregnated paper used is adjusted such that the basis weight of the paper is from about 25 to about 250 g/m$^2$.

Further, the melamine resin to be impregnated into the paper must be fully penetrated into the decorative sheet 2 and thereby integrated therewith when subjected to the heat- and press-molding. Therefore, the melamine resin is preferably such a resin exhibiting a high fluidity under heating.

The content of the melamine resin in the melamine resin-impregnated paper is preferably from 200 to 400 parts by mass on the basis of 100 parts by mass of the paper. When the content of the melamine resin is 200 parts by mass or more, the melamine resin can be fully penetrated into the decorative sheet 2 and integrated therewith when subjected to the heat- and press-molding. When the content of the melamine resin is 400 parts by mass or less, the obtained melamine resin-impregnated paper can exhibit a good handling property.

Meanwhile, the melamine resin may be impregnated into the paper by the method using an impregnator. Then, the resultant impregnated paper is dried to produce the aimed melamine resin-impregnated paper.

The core layer 4 disposed underneath the melamine resin-impregnated paper serves for imparting a thickness and a strength as required to the decorative plate. As the core layer, there may be suitably used a core paper produced by impregnating a thermosetting resin such as a phenol resin into an unbleached kraft paper having a basis weight of about 100 to about 200 g/$m^2$. The amount of the phenol resin impregnated is not particularly limited, and is usually from about 20 to about 50% by mass. The number of the core papers used in the core layer 4 may be appropriately determined depending upon the thickness of the high-pressure melamine resin decorative plate. Further, the respective core papers may be previously subjected to heat- and press-molding to melt and solidify the resin contained therein and thereby smoothen a surface of the core papers.

Meanwhile, in the preferred embodiment of the present invention, the phenol resin used in the core layer may be replaced with a melamine resin.

In addition, as the core layer 4, there may also be used wood materials such as sliced veneers, veneers, plywood, particle boards and medium-density fiber (MDF) boards which are made of various materials such as Japanese cryptomeria, hinoki cypress, keyaki, pine, lauan, teak and Melapi. These wood materials may be used alone or in the form of a laminate of any two or more thereof.

Meanwhile, the core layer 4 may be provided on a back surface thereof with a backer layer made of a fibrous substrate impregnated with a thermosetting resin or a wooden substrate in order to prevent warpage thereof. In order to prevent warpage of the core layer 4, there may also be used a method of laminating a synthetic resin film made of vinyl chloride, polyethylene, polypropylene, etc., on the core layer; a method of laminating a two-layer sheet composed of a paper and a synthetic resin layer on the core layer; a method of laminating a paper-based sheet formed by bonding two paper substrates such as two thin cut sheet papers to each other through an extruded coating layer made of a polyolefin-based resin such as polyethylene, polypropylene and ethylene-vinyl acetate copolymers, on the core layer. Further, there may also be used a method of attaching a moisture-proof sheet made of a synthetic resin substrate layer and a vapor-deposited layer onto a back surface of the core layer 4, etc.

The decorative plate 1 of the present invention may be produced by successively laminating the melamine resin-impregnated paper 3 and the core layer 4 in this order on a back surface of the decorative sheet 2 and then subjecting the resultant laminated structure to press- and heat-molding. The pressing and heating conditions such as pressure, temperature and time may be appropriately determined depending upon kind of thermosetting resin selected, as well as the core paper, overlay paper and substrate simultaneously processed together therewith. The pressure is usually from 5.9 to 9.8 MPa (60 to 100 kg/$cm^2$); the temperature is usually from 110 to 160° C.; and the time is usually from about 10 to about 60 min.

The thus produced decorative plate may be cut into an optional size, and then the surface or butt end portion thereof may be subjected to optional decorating processes such as grooving and chamfering by means of a cutting machine such as a router and a cutter. The resultant decorative plate may be used in various applications, e.g., interior or exterior materials for buildings such as walls, ceilings and flooring materials; surface decorative plates for fittings such as window frames, doors, balustrades, baseboards, verandahs and malls as well as for cabinets of kitchen wares, furniture, light-electrical appliances or OA devices; interior and exterior equipments for vehicles, etc.

EXAMPLES

The present invention will be described in more detail by referring to the following examples. However, it should be noted that these examples are only illustrative and not intended to limit the invention thereto.

Example 1

(1) Production of Decorative Sheet

Using an impregnated paper having a basis weight of 60 g/$m^2$ as the substrate 21, a (whole solid printing) layer having a coating amount of 5 g/$m^2$ was formed on one surface of the substrate with an ink containing a binder composed of an acrylic resin and nitrocellulose and a colorant composed of titanium white, iron oxide red and chrome yellow by a gravure printing method, thereby forming a colored layer 26. A pattern layer 26 with a woodgrain pattern was formed on the colored layer 25 by a gravure printing method using an ink containing a binder composed of nitrocellulose and a colorant composed mainly of iron oxide red.

Next, a coating composition containing a binder composed of a polyester urethane-based resin having a number-average molecular weight of 20,000 and a glass transition temperature (Tg) of −59.8° C. and a polyisocyanate obtained from tolylene diisocyanate, was applied in a coating amount of 7 g/$m^2$ over a whole surface of the substrate by a gravure printing method, thereby forming a penetration-preventing layer 27 (primer layer).

Next, using an ink composition prepared by blending 100 parts by mass of a transparent ink containing a polyester urethane-based resin having a number-average molecular weight of 30,000 and a glass transition temperature (Tg) of −62.8° C. as a binder with 10 parts by mass of silica particles having an average particle size of 1.5 μm, an ink pattern was printed by a gravure printing method so as to coordinate with a vessel portion of the woodgrain pattern of the pattern layer 26, thereby forming a low-gloss pattern ink layer 22.

Then, an electron beam-curable resin composition composed of 60 parts by mass of ethyleneoxide-modified trimethylolpropane ethyleneoxide triacrylate as a trifunctional acrylate monomer, 40 parts by mass of dipentaerythritol hexaacrylate as a hexafunctional acrylate monomer, 2 parts by mass of silica particles having an average particle size of 5 μm and 1 part by mass of a silicone acrylate prepolymer was applied in a coating amount of 5 g/$m^2$ over these ink layers by a gravure offset coater method. After coating, an electron beam was irradiated to the thus applied electron beam-curable resin composition at an acceleration voltage of 175 kV and an exposure dose of 50 kGy (5 Mrad) to cure the composition, thereby forming a surface protective layer 24. Then, the resultant laminate was cured at 70° C. for 24 h, thereby obtaining a decorative sheet 2.

(2) Production of Decorative Plate

A commercially available melamine resin-impregnated paper formed by impregnating 300% by mass of a melamine resin (available from Simel Inc.) into a paper having a basis weight of 22 g/m$^2$ (available from Mead Corp.), a core layer formed by impregnating 30% by mass of a phenol resin into a kraft paper having a basis weight of 200 g/m$^2$, and a backer layer made of a melamine resin-impregnated paper, were successively laminated in this order on a back surface of the above produced decorative sheet 2. The resultant laminated structure was sandwiched between mirror plates and heated at 147° C. for 30 min while applying a pressure of 7.8 MPa (80 kg/cm$^2$) thereto to allow the resin to be penetrated, cured and integrated, thereby obtaining a high-pressure melamine resin decorative plate.

The resin decorative plate thus obtained in Example 1 exhibited an adequate coordination between the vessel portion of the woodgrain pattern and the low-gloss portion, and still maintained a good design property of the printed paper even after the pressing. More specifically, the thus obtained decorative sheet and the decorative plate produced by using the decorative sheet were tested to measure a change in gloss thereof by the following method. The results are shown in Table 1. From the results shown in Table 1, it was confirmed that the change in gloss between the decorative sheet and the resin decorative plate was extremely small, and these products were therefore free from deterioration in design property, in particular, design of the vessel portion, even when subjected to heat- and press-molding during the process for production of the resin decorative plate.

Method for Evaluation of Gloss

The gloss value was measured at an incident angle of 75° using a gloss meter "GMX-203" available from Murakami Shikisai Gijutsu Kenkyusho, Co., Ltd. The higher value indicates a higher gloss (higher luster), and the lower value indicates a lower gloss (lower luster).

In addition, even when compared with a decorative plate produced by using an ordinary thin cut sheet coated paper, the thus obtained decorative plate was excellent in impact resistance because its hardness was structurally higher than that of such a laminated board. Further, since the papers were bonded together with the resin, the decorative plate showed a good tape-peeling property.

Comparative Example 1

The same procedure as in Example 1 was repeated except for forming no low-gloss pattern ink layer 22, thereby producing a decorative plate. As a result, it was confirmed that the difference in gloss between a grain portion and a vessel portion of the woodgrain pattern of the obtained decorative plate was more unclear as compared to that of the decorative plate obtained in Example 1.

Comparative Example 2

The same procedure as in Example 1 was repeated except for using a thermosetting urethane resin composition prepared by adding 2 parts by mass of silica particles having an average particle size of 5 μm and 1 part by mass of a silicone acrylate prepolymer to a thermosetting urethane resin "UC CLEAR 120" available from Dai-Nippon Ink Co., Ltd., in place of the electron beam-curable resin composition, thereby producing a decorative plate. The change in gloss between the decorative sheet and the decorative plate produced by using the decorative sheet was measured in the same manner as in Example 1. The results are shown in Table 1. As a result, it was confirmed that the difference in gloss between a grain portion and a vessel portion in the woodgrain pattern of the obtained decorative plate was lost owing to increase in whole gloss thereof, resulting in deteriorated design property of the decorative plate.

TABLE 1

| | Gloss | |
|---|---|---|
| | Before pressing | After pressing |
| Example 1 | 47 to 56 | 47 to 57 |
| Comparative Example 2 | 30 to 40 | 64 to 67 |

INDUSTRIAL APPLICABILITY

In accordance with the present invention, it is possible to provide a high-pressure melamine resin decorative plate which is free from deterioration in design property of a decorative sheet even when applying a high temperature and a high pressure thereto during the production process. The decorative plate of the present invention can be suitably used in various applications, e.g., interior or exterior materials for buildings such as walls, ceilings and flooring materials; surface decorative plates for fittings such as window frames, doors, balustrades, baseboards, verandahs and malls as well as for cabinets of kitchen wares, furniture, light-electrical appliances or OA devices; interior and exterior equipments for vehicles, etc.

What is claimed is:

1. A melamine resin decorative plate, formed under a pressure of 5.9-9.8 MPa and a temperature of 110° -160° C., for a time of 10 to 60 minutes, and comprising a decorative sheet, a melamine resin-impregnated paper and a core layer which is produced by successively laminating the melamine resin-impregnated paper and the core layer in this order on a back surface of the decorative sheet and then subjecting the resultant laminated structure to heat- and press-molding under said pressure and temperature and for said time, wherein the decorative sheet comprises at least a substrate, a pattern layer laminated on the substrate, a pattern ink layer formed by a pattern ink, provided on part of the substrate, leaving a remaining portion of the substrate not having a pattern ink layer formed thereon, and a surface protective layer which is present on and contacted with the pattern ink layer so as to cover a whole surface including both said pattern ink layer and said remaining portion of the substrate not having the pattern ink layer thereon; the surface protective layer is formed by crosslinking and curing an ionizing radiation-curable resin composition, the surface protective layer having formed therein a first region which is located in a part just above the pattern ink layer and in the vicinity of the part just above the pattern ink layer; the pattern ink, forming the pattern ink layer, contains a non-crosslinked urethane resin and an unsaturated polyester resin as a binder; the ionizing radiation-curable resin composition contains a (meth)acrylate monomer; the pattern ink layer is coordinated with a portion of the pattern expressed by the pattern layer which is to be delustered and visually recognized as a concave portion due to a difference in gloss in viewing the decorative plate from a side of the surface protective layer wherein said first region is a region in which a suspended condition between said pattern ink layer and said surface protective layer occurs, and in the first region the pattern ink and the resin composition of the surface protective layer have interacted with each other to provide elution, dispersion and mixing therebetween, so as to provide the suspended condition in the first region.

2. The melamine resin decorative plate according to claim 1, wherein the ionizing radiation-curable resin composition is constituted of the (meth)acrylate monomer solely.

3. The melamine resin decorative plate according to claim 1, wherein the ionizing radiation-curable resin composition is an electron beam-curable resin composition.

4. The melamine resin decorative plate according to claim 1, wherein the pattern ink layer and the surface protective layer which is present on and contacted with the pattern ink layer so as to cover a whole surface including both the first region where the pattern ink layer is formed and the remaining region where no pattern ink layer is formed, are successively formed on the pattern layer.

5. The melamine resin decorative plate according to claim 4, wherein the pattern layer has a woodgrain pattern, and the pattern ink layer forms the first region corresponding to a vessel portion of the woodgrain pattern.

6. The melamine resin decorative plate according to claim 1, wherein said first region reaches an outermost surface of the surface protective layer.

7. The melamine resin decorative plate according to claim 1, wherein said first region extends to a position between surfaces of the surface protective layer in a thickness direction thereof.

8. The melamine resin decorative plate according to claim 1, wherein said urethane resin has a number average molecular weight of from about 10,000 to about 50,000, and a glass transition temperature of from −70 to −40° C.

9. The melamine resin decorative plate according to claim 1, wherein a coating amount of said pattern ink layer is from 1 to 30 $g/m^2$.

10. The melamine resin decorative plate according to claim 1, wherein said ionizing radiation-curable resin composition further includes an ethyleneoxide-modified polymerizable compound and baked kaolin particles.

11. The melamine resin decorative plate according to claim 1, further comprising a penetration-preventing layer positioned between the substrate and the pattern ink layer.

12. The melamine resin decorative plate according to claim 1, wherein an outermost surface of the surface protective layer has a convex shape overlying said pattern ink layer.

* * * * *